(12) United States Patent
Gertz et al.

(10) Patent No.: US 7,817,098 B2
(45) Date of Patent: Oct. 19, 2010

(54) MEDICAL DEVICE WITH A RADIO FREQUENCY DETECTION DEVICE

(75) Inventors: Marc-Oliver Gertz, Lübeck (DE); Olaf Schermeier, Lübeck (DE); Gerd Wotha, Warnsdorf (DE)

(73) Assignee: Dräger Medical AG & Co. KG, Lübeck (DE)

( * ) Notice: Subject to any disclaimer, the term of this patent is extended or adjusted under 35 U.S.C. 154(b) by 623 days.

(21) Appl. No.: 11/851,461

(22) Filed: Sep. 7, 2007

(65) Prior Publication Data
US 2008/0062061 A1 Mar. 13, 2008

(30) Foreign Application Priority Data
Sep. 8, 2006 (DE) .................. 10 2006 042 346

(51) Int. Cl.
*H01Q 7/04* (2006.01)
(52) U.S. Cl. .................. 343/842; 343/841; 343/702
(58) Field of Classification Search .................. 343/702, 343/841, 842, 741, 742, 866, 867
See application file for complete search history.

(56) References Cited

U.S. PATENT DOCUMENTS

| 2005/0060011 | A1* | 3/2005 | Denker et al. .................. 607/60 |
| 2006/0164251 | A1 | 7/2006 | Meyers et al. |
| 2007/0262777 | A1* | 11/2007 | Warntjes et al. ............. 324/318 |
| 2008/0064445 | A1* | 3/2008 | Schermeier et al. ...... 455/562.1 |

* cited by examiner

*Primary Examiner*—HoangAnh T Le
(74) *Attorney, Agent, or Firm*—McGlew and Tuttle, P.C.

(57) ABSTRACT

A medical device and system is provided with a device housing and with a radio frequency detection device. The radio frequency detection device is functionally connected to an antenna for detecting a radio frequency identification element. The radio frequency detection device has a transmitter and an at least partly electrically conductive shield, which encloses at least the transmitter such that a field generated by the transmitter is effectively shielded towards the outside and the antenna is arranged within the housing and outside the shield.

20 Claims, 2 Drawing Sheets

Fig. 2
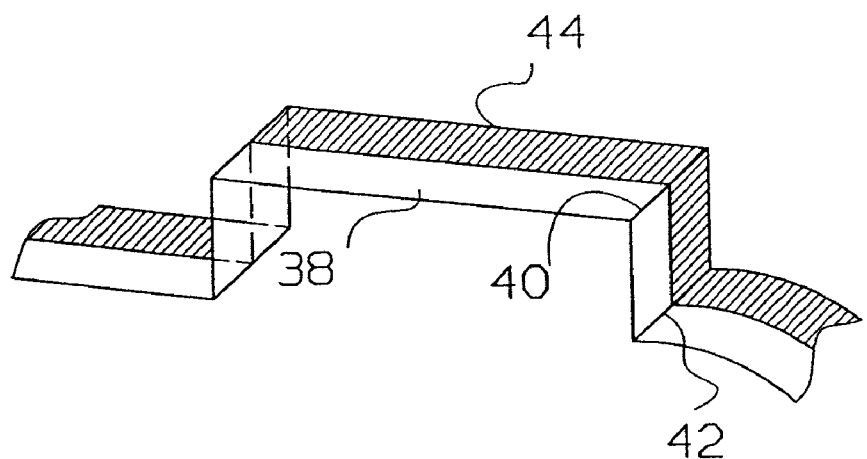
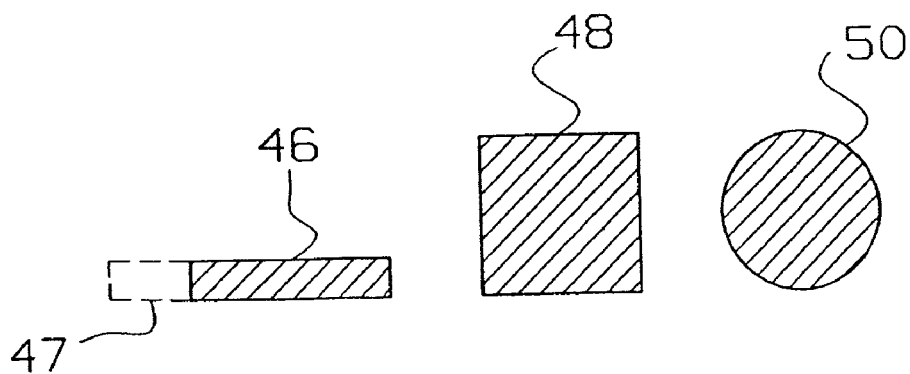
Fig. 3B
Fig. 3A
Fig. 3C

MEDICAL DEVICE WITH A RADIO FREQUENCY DETECTION DEVICE

CROSS REFERENCE TO RELATED APPLICATIONS

This application claims the benefit of priority under 35 U.S.C. §119 of German Patent Application DE 10 2006 042 346.1 filed Sep. 8, 2006, the entire contents of which are incorporated herein by reference.

FIELD OF THE INVENTION

The present invention pertains to a medical device with a housing and with a radio frequency detection device, wherein the radio frequency detection device is functionally connected to an antenna for detecting a radio frequency identification. Medical devices, especially respirators with at least one radio frequency detection device for detecting a radio frequency identification (RFID) connected to a breathing tube, have the problem that if components of the medical device are arranged within the housing, it is necessary to take into account the fact that an antenna of a radio frequency detection device is often formed on a board of a transmitter of the radio frequency detection device in the form of a loop, especially by etching. Since the antenna of the radio frequency detection device for detecting the radio frequency identification is formed by means of a magnetic near field, the antenna must be arranged, together with the transmitter, in an area or adjacent to the area that forms a detection range for the radio frequency identification.

BACKGROUND OF THE INVENTION

An RFID reader, which can be held in one hand, is known from US 2006/0164251 A1. The RFID reader has a housing with a circumference in the area of the inner edge. The RFID reader also has a dipole antenna made in the natural size. The dipole antenna has two antenna elements, which are coupled by means of a symmetrical transmission. The antenna has a nearly uniform antenna gain over an angle range. The RFID reader also has a transmitter-and-receiver unit, which is connected to the dipole antenna via suitable cables. The transmitter-and-receiver unit is designed to transmit and receive signals. The antenna elements of the dipole antenna are wound along a circumference around an inner edge of the housing.

SUMMARY OF THE INVENTION

The basic object of the present invention is to provide a medical device which makes possible an improved arrangement of the components within the housing of the medical device.

This object is accomplished by a medical device with a housing and with a radio frequency detection device, wherein the radio frequency detection device is functionally connected to an antenna for detecting a radio frequency identification element. The radio frequency detection device has a transmitter and an electrically conductive shield, which encloses at least the transmitter such that electromagnetic radiation generated by the transmitter or a field generated by the transmitter, especially magnetic or electromagnetic field, is effectively shielded towards the outside and the antenna is arranged within the housing and outside the shield. As a result, the radio frequency detection device or the transmitter can be arranged at nearly any desired site within the housing.

The antenna can advantageously also be arranged independently from the radio frequency detection device or independently from the transmitter in an area which is intended to form a detection device, generated by a magnetic near field of the antenna. The housing preferably forms at least one part of the medical device that is a mechanically load-bearing part or offers protection against mechanical effects. As a result, components of the medical device are advantageously protected from being touched by a user. The housing may advantageously have a mechanical and/or functionally active shape, for example, a mechanical connection for a breathing tube.

In a preferred embodiment, the antenna is arranged at least partly or completely directly at an inner surface of the housing, especially of a housing wall.

The antenna preferably also forms, at least partly, a housing inner surface, especially in the area of a tube connection. Space can thus advantageously be saved in the interior of a housing. Furthermore, the antenna can advantageously generate, as a result, a detection range that comprises an area of a housing wall of the housing.

In a preferred embodiment variant, the antenna is connected to the housing especially at least in some sections. The antenna is also preferably connected to the housing by means of an adhesive material, for example, an adhesive. In a preferred embodiment, the antenna touches the inner surface of the housing at least in some sections.

In an exemplary embodiment, the antenna is formed by an electrically conductive loop. For example, such an electrically conductive loop can be formed by a wire, especially a wire with a round cross section, with a rectangular cross section, and especially with a square cross section or with a cross section of another shape. As a result, the antenna can be advantageously adapted to a housing shape. The antenna is preferably shaped such that the antenna clings to the inner surface of the housing and touches this inner surface directly at least in some sections.

In a preferred embodiment, the antenna is formed by an electrically conductive layer. Furthermore, the electrically conductive layer is vapor-deposited on the inner surface of the housing. As a result, the electrically conductive layer can advantageously form a part of the inner surface of the housing. In another embodiment, the electrically conductive layer forming the antenna is applied to the inner surface of the housing and preferably connected to same by electroplating. As an alternative to vapor deposition on the inner surface of the housing, the antenna, especially the electrically conductive layer, can be applied to the inner surface of the housing by means of cathodic sputtering.

In an advantageous embodiment, the antenna is enclosed in a housing wall. The antenna can advantageously be enclosed in the housing wall at least in some sections during the injection molding of the housing. In another embodiment, the antenna is integrated within a housing wall. For example, the housing may have for this purpose a groove for receiving the antenna at least in some sections.

The housing is preferably formed at least partly by a thermoplastic in this embodiment.

Other advantageous materials for a housing are polystyrene, polyamide, polypropylene, polyethylene, polycarbonate, or a combination thereof. Advantageous materials for an antenna are copper, aluminum, iron, or an alloy that contains at least one of the above-mentioned materials.

In an advantageous embodiment, the antenna is formed by a longitudinally extending strip with at least one flat side. Furthermore, the antenna is advantageously formed by a longitudinally extending strip with two flat sides. The antenna can thus advantageously be made to cling to an inner wall of the housing. The antenna can advantageously also be caused to cling to a round, a straight or an angularly shaped housing inner wall. Clinging to the housing inner wall preferably also includes the case in which the antenna touches the housing inner wall, especially in an uninterrupted manner.

In another preferred embodiment, a loop shape of the antenna has at least one angular longitudinal section. As a result, the antenna can be advantageously made in one piece with an angular inner area of the housing.

In a preferred embodiment variant, a loop shape of the antenna has at least one roundly extending longitudinal section. As a result, the antenna can be advantageously made in one piece with a roundly extending housing area.

A shape of the loop formed by means of the antennas preferably has at least one rotatory and/or at least one translatory degree of freedom. The antenna can thus be led around corners and/or along curves, especially in case of an antenna with a flat wall shape. The antenna preferably also extends in the direction of two translatory axes Tx, Ty, and forms radii along the solid angle direction Rz.

Furthermore, the antenna preferably extends along three translatory axes Tx, Ty, Tz and forms radii along the directions of all of two solid angles Rz, Rx. Furthermore, the antenna preferably extends along three translatory axes Tx, Ty, Tz and forms radii in all three solid angle directions Rx, Ry, Rz.

In a preferred embodiment, the antenna is connected to a compensation member, which is arranged outside the screen. Furthermore, the compensation member preferably has an adjustable capacitor and is designed to change and set a natural frequency, especially a natural frequency of the radio frequency detection device forming a carrier frequency. In an advantageous embodiment, the antenna is connected to the transmitter by means of an especially shielded connection line. The antenna can thus be advantageously arranged at a spaced location from the transmitter.

The present invention will be explained below on the basis of figures and additional exemplary embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a cut away partially sectional view showing an exemplary embodiment of a housing of a medical device with an antenna of a radio frequency detection device;

FIG. 3A is a cross sectional view of an antenna for a radio frequency detection device of an exemplary embodiment according to the invention;

FIG. 3B is a cross sectional view of an antenna for a radio frequency detection device of another exemplary embodiment according to the invention;

FIG. 3C is a cross sectional view of an antenna for a radio frequency detection device of another exemplary embodiment according to the invention.

DESCRIPTION OF THE PREFERRED EMBODIMENTS

Figure 1:
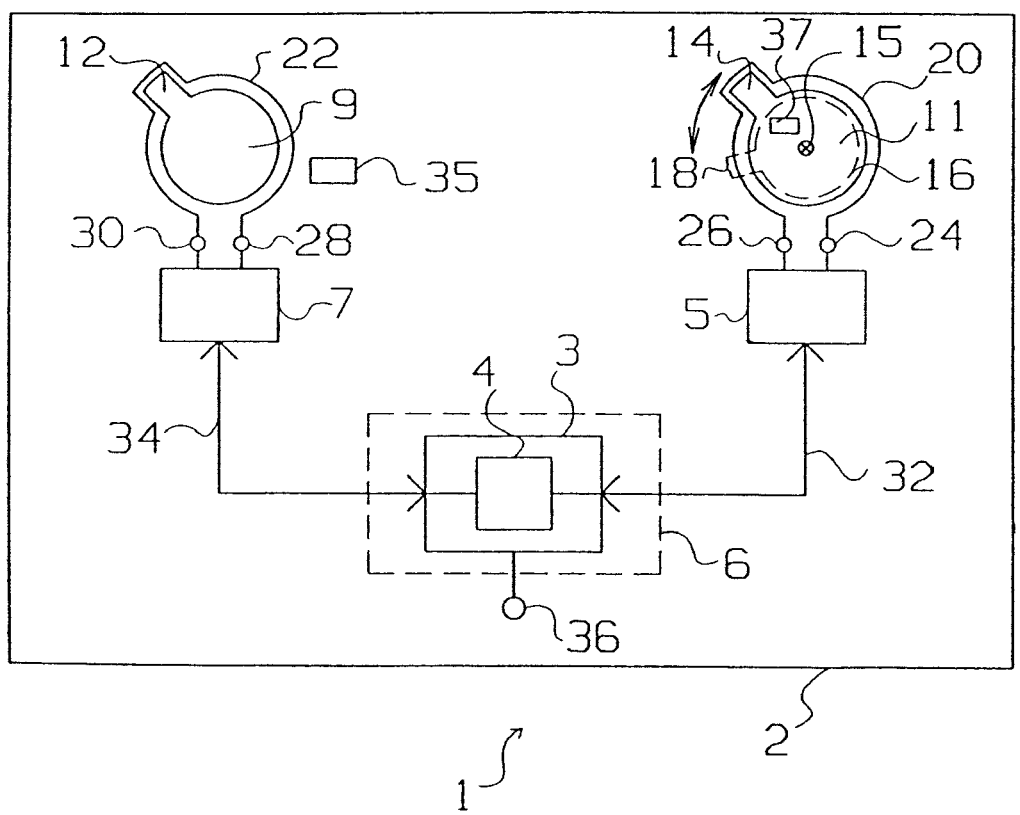
FIG. 1 is a schematic view showing an exemplary embodiment of a medical device with a radio frequency detection system according to the invention.

Referring to the drawings in particular, FIG. 1 schematically shows an exemplary embodiment of a medical device 1. The medical device 1 has a housing 2. The medical device 1 also has a radio frequency detection device 3 with an adapter 5 and with an adapter 7. The adapter 5 and with an adapter 7 act as compensation devices.

The housing 2 has an opening 9 and an opening 11, which are formed each for introducing one end of a breathing tube. The opening 9 has a recess 12, which is designed for passing through a correspondingly designed cam of a breathing tube. The opening 11 has a recess 14, which is designed for passing through a correspondingly designed cam 18 of a connection piece 16 of an end section of a breathing tube.

The connection piece 16 is designed as a bayonet connection, the cam 18 being designed to be passed through the recess 14 and to secure the connection piece 16 against moving back along the axis 15 in a positive-locking manner by rotating it about an axis 15. The cam 18 is designed to extend behind a corresponding projection area or a housing wall section of the housing 2 in the area of the opening 11 in a positive-locking manner and thus to secure the connection piece 16 against moving back in a positive-locking manner.

The radio frequency detection device 3 is connected at least indirectly to an antenna 20 and at least indirectly to an antenna 22.

The radio frequency detection device 3 has a transmitter 4 for a radio frequency signal and is enclosed by a shield 6 such that a magnetic or electromagnetic field generated by the transmitter 4 is sufficiently shielded. The shield may be formed by a shielding plate or a shielding grid and is at least partly electrically conductive.

A shield may also be formed by a plastic housing on which an electrically conductive layer is deposited by vapor deposition, wherein the plastic may have polystyrene, polyamide, polypropylene, polyethylene, polycarbonate, polyamide or a combination thereof.

The antenna 20 has a loop-shaped design and encloses the opening 11 at least over some sections of the circumference. The antenna 20 has a detection range that extends radially outwardly along a direction in which the loop extends. The antenna 20 is designed in this exemplary embodiment as a wire loop, which has a rectangular, circular or round cross section. The antenna 20 also encloses the opening 14, so that the antenna 20 has a corresponding shape—a rectangular shape in this exemplary embodiment—in the area of the opening 14. The antenna 20 has a terminal 24 and a terminal 26 and is connected to the adapter 5 via the terminal 24 and the terminal 26. The antenna 20 is directly in contact with a housing wall of the housing 2 along the circumference of its loop, except in the section in the area of the terminal 24 and except in a section in the area of the terminal 26, so that the antenna 20 is made to cling to the housing wall of the housing 2.

Radio frequency identification element 37, hereinafter also called an RFID tag 37, is shown, the RFID tag 37 being connected to the connection piece 16 in the area of the end intended for being passed through the opening 11. The RFID tag 37 is consequently arranged in the detection range of the antenna 20 and can be detected by the antenna 20. The radio frequency detection device 3 is designed to generate a radio frequency signal and to transmit this on the output side to the antenna 20 or to the antenna 22.

The radio frequency detection device 3 is connected to the compensation member or adapter 5 via a connection line 32. The adapter 5 has at least one capacitor and/or an inductance, the capacitor and/or the inductance being provided for tuning a natural frequency for detecting the RFID tag 37. The capacitor may be an adjustable capacitor.

The RFID tag 37 is designed to extract field energy from a magnetic near field generated by the antenna 20 and to modulate the magnetic near field as a function of an identification information represented by the RFID tag 37. The magnetic near field is thus amplitude-modulated by the RFID tag 37. This amplitude modulation brings about a reaction to a current, which generates the magnetic near field and flows in the radio frequency detection device 3.

The radio frequency detection device 3 is designed to detect these changes in current which are generated by modulation and has a demodulator for this purpose. The radio frequency detection device 3 has an output 36 and is designed to generate an identification signal in case a predetermined radio frequency identification, especially the RFID tag 37, is present, and to output this signal at the output 36. The radio frequency detection device 3 is connected to the compensation member or adapter 7 via a connection line 34. The compensation member or adapter 7 is connected on the output side, via a terminal 28 and a terminal 30, to the antenna 22, which has a loop-shaped design. The antenna 22 encloses the opening 9 and the recess 12. Radio frequency identification element 35, which is connected to the housing wall of the housing 2 in the area of the opening 9 and is arranged in the detection device of the antenna 22, is shown as well.

The radio frequency identification 35 is provided for testing the radio frequency detection device 3, the radio frequency detection device 3 being designed to detect the radio frequency identification 35 via the antenna 22 and to generate the test signal representing the detection result. The radio frequency detection device 3 can thus perform a self-test.

The radio frequency detection device 3 shown in FIG. 1 can operate at a natural frequency in the range of 125 kHz, 135 kHz, 13.56 MHZ, 27 MHZ, 433 MHZ or in the range between 1 GHz and 10 GHz. The above-described load modulation method, according to which the above-described radio frequency detection device and the radio frequency identification can operate, may be a modulation method according to an ASK (amplitude shift keying) method or a PSK (phase shift keying) method.

Radio frequency identification element may have a modulator, which is designed to modulate a magnetic near field corresponding to a stored identification information. The radio frequency identification may be a surface wave transponder.

FIG. 2 shows an exemplary embodiment for an antenna 44 for a radio frequency detection device, especially of a medical device, wherein the antenna 44 is applied to a surface of a housing 38 by vapor deposition or is applied electrolytically. The antenna 44 forms a longitudinally extended, thin strip in this exemplary embodiment, the longitudinally extended thin strip having a thickness in the range of 10 μm to 200 μm. The antenna 44 is led around a fold 40 and a fold 42 of the housing 38 and is shaped corresponding to an angular housing shape and an adjoining round housing shape in the area of the fold 40 and in the area of the fold 42.

The antenna 22 shown in FIG. 1 and the antenna 20 shown in FIG. 1 may be designed, unlike in the manner described in FIG. 1, corresponding to the antenna 44. For example, the housing 2 may have a tubular section for this purpose in the area of the opening 11 and/or in the area of the opening 9, and a tubular wall of the tubular section encloses the opening 9 and the opening 11, respectively, in such a way that the connection piece 16 can be introduced into a lumen of the tubular section enclosed by the tubular wall.

The antenna 44 may be arranged, for example, on an outer surface of the tubular section. The antenna 4 can thus surround the lumen enclosed by the tubular section and detect, for example, the RFID tag 37. In case of an antenna designed corresponding to the antenna 44 for the housing 2, the terminals 24, 26 and 28 and 30 may have contact springs each, which are designed to establish a physical contact with the antenna 44.

The housing section 38 shown in FIG. 2 may be, for example, a housing area of the housing 2 shown in FIG. 1 in the area of the recess 14; in particular, the housing area 38 may be part of the above-described tubular section.

FIG. 3 shows an exemplary embodiment of cross-sectional shapes of an antenna for a radio frequency detection device, especially of a medical device. A cross section 46 of a strip-shaped antenna is shown. The strip-shaped antenna may be laminated, for example, into a plastic film. The plastic film may be a thermoplastic, especially polyethylene, polypropylene or polyamide. The cross section 46 has a thickness 47. Examples of the thicknesses of an antenna with a cross section 46 are in the range of 100 μm to 400 μm.

A cross-sectional shape of an antenna for a radio frequency detection device may have a rectangular, especially square cross section 48. In another embodiment, an antenna for a radio frequency detection device has a circular cross section 50.

Examples of materials for the antenna 44 shown in FIG. 2, which are applied as a thin layer to the surface of the housing, are silver, copper or graphite or a combination thereof.

Examples of materials for the antennas shown in FIGS. 1 and 3 are copper, silver or graphite or a combination thereof.

While specific embodiments of the invention have been shown and described in detail to illustrate the application of the principles of the invention, it will be understood that the invention may be embodied otherwise without departing from such principles.

APPENDIX

List of Reference Numerals

1. Medical device
2. Housing
3. Radio frequency detection device
4. Transmitter
6. Shield
5, 7. Compensation Member or Adapter
9, 11. Opening
12, 14. Recess
15. Axis
16. Connection piece
18. Cam
20, 22. Antenna
24, 26, 28, 30. Terminal
32, 34 Connection line
35, 37. Radio frequency identification element
36. Output
38. Housing
40, 42 Fold
44 Antenna
46, 48, 50. Cross section

What is claimed is:

1. A medical device comprising:
    a housing;
    a radio frequency detection device comprising a transmitter and an at least partly electrically conductive shield, which encloses said transmitter such that a field generated by said transmitter is effectively shielded towards the outside; and
    an antenna functionally connected to said radio frequency detection device for detecting a radio frequency identification element, said antenna being arranged within or on said housing and outside of said shield.

2. A medical device in accordance with claim 1, wherein said antenna is arranged at least partly or completely directly at the inner surface of said housing.

3. A medical device in accordance with claim 1, wherein said antenna is connected to said housing at least in some sections.

4. A medical device in accordance with claim 1, wherein said antenna is formed by at least one electrically conductive loop.

5. A medical device in accordance with claim 1, wherein said antenna is formed by an electrically conductive layer.

6. A medical device in accordance with claim 5, wherein said antenna electrically conductive layer is applied to the inner surface of said housing by vapor deposition or electrolytically.

7. A medical device in accordance with claim 1, wherein said antenna is formed by a longitudinally extending strip with at least one flat side.

8. A medical device in accordance with claim 1, wherein said antenna has a loop shape with at least one angular longitudinal section.

9. A medical device in accordance with claim 1, wherein said antenna has a loop shape with at least one roundly extending longitudinal section.

10. A medical device in accordance with claim 4, wherein a shape along said loop has at least one rotatory degree of freedom and/or at least one translatory degree of freedom.

11. A medical device in accordance with claim 1, wherein said antenna is connected to a compensation member, which is arranged outside said shield.

12. A medical device in accordance with claim 1, wherein said antenna is connected to said transmitter by a shielded connection line.

13. A medical system comprising:
    a medical device with a housing, a radio frequency detection device comprising a transmitter and an at least partly electrically conductive shield, which encloses said transmitter such that a field generated by said transmitter is effectively shielded towards the outside and an antenna functionally connected to said radio frequency detection device;
    a medical part with a radio frequency identification element, said medical part being connected to said medical device for operation therewith, said antenna being arranged within or on said housing and outside of said shield for detecting said radio frequency identification element.

14. A medical device in accordance with claim 13, wherein said antenna is arranged at least partly or completely directly at the inner surface of said housing.

15. A medical system in accordance with claim 14, wherein said antenna is formed by at least one electrically conductive loop.

16. A medical system in accordance with claim 14, wherein said antenna is formed by an electrically conductive layer formed on a substrate connected to said housing or forming a part of said housing.

17. A medical system in accordance with claim 16, wherein said antenna electrically conductive layer is applied to the inner surface of said housing by vapor deposition or electrolytically.

18. A medical system in accordance with claim 15, wherein a shape along said loop has at least one rotatory degree of freedom and/or at least one translatory degree of freedom.

19. A medical system in accordance with claim 14, wherein said antenna is connected to a compensation member, which is arranged outside said shield.

20. A medical system in accordance with claim 14, wherein said antenna is connected to said transmitter by a shielded connection line.

* * * * *